United States Patent

Caldara et al.

Patent Number: 5,978,359
Date of Patent: *Nov. 2, 1999

[54] ALLOCATED AND DYNAMIC SWITCH FLOW CONTROL

[75] Inventors: Stephen A. Caldara, Sudbury; Stephen A. Hauser, Burlington; Thomas A. Manning, Northboro, all of Mass.

[73] Assignees: Fujitsu Network Communications, Inc., Richardson, Tex.; Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,348

[22] Filed: Jul. 18, 1996

Related U.S. Application Data

[60] Provisional application No. 60/001,498, Jul. 19, 1995.

[51] Int. Cl.[6] .................................................. H04L 12/56
[52] U.S. Cl. ........................................ 370/236; 370/414
[58] Field of Search .................................... 370/413, 414, 370/230, 231, 235, 249, 236, 412, 417, 389, 391, 392, 395, 398, 399, 428, 429, 465, 468

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/1 BES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |

(List continued on next page.)

FOREIGN PATENT DOCUMENTS 484943  3/1992  Japan.

OTHER PUBLICATIONS

Head of Line Arbitration in ATM Switches with Input–Output Buffering and Backpressure Control. By Hosein F. Badran and H. T. Mouftah, *GLOBECOM* '91, pp. 0347–0351.

(List continued on next page.)

*Primary Examiner*—Chau Nguyen
*Assistant Examiner*—Kenneth Vanderpuye
*Attorney, Agent, or Firm*—Weingarten, Schurgin, Gagnebin & Hayes LLP

[57] ABSTRACT

A system is disclosed for eliminating cell loss through the use of flow control of both allocated and dynamic bandwidth. When output buffers in the switch become filled to a predetermined threshold level a feedback message is provided to input buffers to prevent transmission of cells from the input buffers to the output buffers. In order to provide connection and traffic type isolation the buffers are grouped into queues and flow control may be implemented on a per queue basis. The feedback message is a digital signal including an ACCEPT/REJECT message and a NO-OP/XOFF message. An XOFF message can be received while transmitting via allocated bandwidth or dynamic bandwidth. In particular, an XOFF (allocated) message may be received with regard to allocated bandwidth and an XOFF (dynamic) message may be received with regard to dynamic bandwidth. When ACCEPT is received by the requesting input queue the cell is transferred to the output queue. When REJECT is received by the requesting queue the cell is not transferred. When XOFF (dynamic) is received by the requesting input queue further requests to transfer to that output queue by the requesting input queue using dynamic bandwidth are halted until receipt of an XON message from that output queue. When XOFF (allocated) is received by the requesting input queue further requests to transfer to that output queue by the requesting input queue using allocated bandwidth are halted until receipt of an XON message from that output queue.

60 Claims, 3 Drawing Sheets

U.S. PATENT DOCUMENTS

| | | | |
|---|---|---|---|
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/413 |
| 4,849,968 | 7/1989 | Turner | 370/94 |
| 4,870,641 | 9/1989 | Pattavina | 370/397 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/389 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/416 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/392 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/650 |
| 5,084,867 | 1/1992 | Tachibana et al. | 370/399 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/399 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/16 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/401 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/394 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/236 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oamuro et al. | 370/95.1 |
| 5,265,088 | 11/1993 | Takigawa et al. | 370/249 |
| 5,267,232 | 11/1993 | Katsube et al. | 370/17 |
| 5,268,897 | 12/1993 | Komine et al. | 370/400 |
| 5,271,010 | 12/1993 | Miyake et al. | 370/392 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/250 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/236 |
| 5,285,445 | 2/1994 | Lehnert et al. | 370/413 |
| 5,285,446 | 2/1994 | Yonehara | 370/60.1 |
| 5,287,349 | 2/1994 | Hyodo et al. | 370/399 |
| 5,287,535 | 2/1994 | Sakagawa et al. | 370/389 |
| 5,289,462 | 2/1994 | Ahmadi et al. | 370/60 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/220 |
| 5,301,055 | 4/1994 | Bagchi et al. | 370/395 |
| 5,301,184 | 4/1994 | Uriu et al. | 370/60 |
| 5,301,190 | 4/1994 | Tsukuda et al. | 370/398 |
| 5,301,193 | 4/1994 | Toyofuku et al. | 370/395 |
| 5,303,232 | 4/1994 | Faulk, Jr. | 370/94 |
| 5,305,311 | 4/1994 | Lyles | 370/390 |
| 5,309,431 | 5/1994 | Tominaga et al. | 370/230 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/389 |
| 5,315,585 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/330 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sehgupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/395 |
| 5,359,600 | 10/1994 | Ueda et al. | 370/60.1 |
| 5,361,251 | 11/1994 | Aihara et al. | 370/252 |
| 5,361,372 | 11/1994 | Rege et al. | 395/800 |
| 5,363,433 | 11/1994 | Isono | 379/390 |
| 5,365,514 | 11/1994 | Hershey et al. | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/420 |
| 5,377,262 | 12/1994 | Bales et al. | 379/220 |
| 5,377,327 | 12/1994 | Jain et al. | 395/200 |
| 5,379,297 | 1/1995 | Glover et al. | 370/234 |
| 5,379,418 | 1/1995 | Shimazaki et al. | 395/575 |
| 5,390,170 | 2/1995 | Sawant et al. | 370/58.1 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/390 |
| 5,398,235 | 3/1995 | Tsuzuki et al. | 370/16 |
| 5,400,337 | 3/1995 | Munter | 370/399 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |

| | | | |
|---|---|---|---|
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmad et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/392 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/232 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/398 |
| 5,450,406 | 9/1995 | Esaki et al. | 370/60.1 |
| 5,452,296 | 9/1995 | Shimizu | 370/399 |
| 5,455,820 | 10/1995 | Yamada | 370/413 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/399 |
| 5,461,611 | 10/1995 | Drake, Jr. et al. | 370/54 |
| 5,463,620 | 10/1995 | Sriram | 370/412 |
| 5,465,331 | 11/1995 | Yang et al. | 395/800.08 |
| 5,475,679 | 12/1995 | Munter | 370/395 |
| 5,479,401 | 12/1995 | Bitz et al. | 370/397 |
| 5,479,402 | 12/1995 | Hata et al. | 370/397 |
| 5,483,526 | 1/1996 | Ben-Nun et al. | 370/60.1 |
| 5,485,453 | 1/1996 | Wahlman et al. | 370/6 |
| 5,485,455 | 1/1996 | Dobbins et al. | 370/60 |
| 5,487,063 | 1/1996 | Kakuma et al. | 370/396 |
| 5,488,606 | 1/1996 | Kakuma et al. | 370/6 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/231 |
| 5,497,369 | 3/1996 | Wainwright | 370/390 |
| 5,499,238 | 3/1996 | Shon | 370/60.2 |
| 5,504,741 | 4/1996 | Yamanaka et al. | 70/58.2 |
| 5,504,742 | 4/1996 | Kakuma et al. | 370/420 |
| 5,506,834 | 4/1996 | Sekihata et al. | 370/253 |
| 5,506,839 | 4/1996 | Hatta | 370/236 |
| 5,506,956 | 4/1996 | Cohen | 395/182.04 |
| 5,509,001 | 4/1996 | Tachibana et al. | 370/230 |
| 5,509,007 | 4/1996 | Takashima et al. | 370/391 |
| 5,513,134 | 4/1996 | Cooperman et al. | 365/49 |
| 5,513,178 | 4/1996 | Tanaka | 370/395 |
| 5,513,180 | 4/1996 | Miyake et al. | 370/352 |
| 5,515,359 | 5/1996 | Zheng | 370/13 |
| 5,517,495 | 5/1996 | Lund et al. | 370/399 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/399 |
| 5,521,923 | 5/1996 | Willman et al. | 370/94.1 |
| 5,523,999 | 6/1996 | Takano et al. | 370/389 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/395 |
| 5,528,591 | 6/1996 | Lauer | 370/79 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/429 |
| 5,535,197 | 7/1996 | Cotton | 370/60 |
| 5,537,394 | 7/1996 | Abe et al. | 370/252 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/395 |
| 5,544,170 | 8/1996 | Kasahara | 370/253 |
| 5,546,389 | 8/1996 | Wippenback et al. | 370/60 |
| 5,546,391 | 8/1996 | Hochschild et al. | 370/60 |
| 5,546,392 | 8/1996 | Boal et al. | 370/60.1 |
| 5,550,815 | 8/1996 | Lloonan et al. | 370/396 |
| 5,550,821 | 8/1996 | Akiyoshi | 370/352 |
| 5,550,823 | 8/1996 | Irie et al. | 370/413 |
| 5,553,057 | 9/1996 | Nakayama | 370/241 |
| 5,553,068 | 9/1996 | Aso et al. | 370/60 |
| 5,555,243 | 9/1996 | Kakuma et al. | 370/352 |
| 5,555,265 | 9/1996 | Kakuma et al. | 370/395 |
| 5,557,607 | 9/1996 | Holden | 370/53.2 |
| 5,568,479 | 10/1996 | Watanabe et al. | 370/399 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/395 |
| 5,577,032 | 11/1996 | Sone et al. | 370/390 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |
| 5,636,365 | 6/1997 | Tanioka | 711/163 |
| 5,666,360 | 9/1997 | Chen et al. | 370/390 |
| 5,724,351 | 3/1998 | Chao et al. | 370/395 |

OTHER PUBLICATIONS

H.T. Kung and K. Chang, Receiver–Oriented Adaptive Buffer Allocation in Credit–Based Flow Control for ATM Networks, Proceedings of INFOCOM '95, Apr. 2–6, 1995, pp. 1–14.

H.T. Kung, et al., Credit–Based Flow Control for ATM Networks: Credit Update Protocol, Adaptive Credit Allocation and Statistical Multiplexing, Proceedings of ACM SIG-COMM '94 Symposium on Communications Architectures Protocols and Applications, Aug. 31–Sep. 2, 1994, pp. 1–14.

An Ascom Timeplex White Paper, Meeting Critical Requirements with Scalable Enterprise Networking Solutions Based on a Unified ATM Foundation, pp. 1–12, Apr. 1994 –Apr. 1995?.

Douglas H. Hunt, ATM Traffic Management — Another Perspective, Business Communications Review, Jul. 1994.

Richard Bubenik et al., Leaf Initiated Join Extensions, Technical Committee, Signalling Subworking Group, ATM Forum/94–0325R1, Jul. 1, 1994.

Douglas H. Hunt et al., Flow Controlled Virtual Connections Proposal for ATM Traffic Management (Revision R2) Traffic Management Subworking Group, ATM_Forum/94–0632R2, Aug. 1994.

Flavio Bonomi et al., The Rate–Based Flow Control Framework for the Available Bit Rate ATM Service, IEEE Network, Mar./Apr. 1995, pp. 25–39.

R. Jain, Myths About Congestion Management in High Speed Networks, Internetworking Research and Experience, vol. 3, 101–113 (1992).

Douglas H. Hunt et al., Credit–Based FCVC Proposal for ATM Traffic Management (Revision R1), ATM Forum Technical Committee Traffic Management Subworking Group, ATM_Forum/94–0168R1, Apr. 28, 1994.

Douglas H. Hunt et al., Action Item Status for Credit–Based FCVC Proposal, ATM Forum Technical Committee Traffic Management Subworking Group, ATM_Forum/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, ATM Forum/94–0460, Apr. 28, 1994.

Richard Bubenick et al., Leaf Initiated Join Extensions, Technical Committee, Signalling Subworking Group, ATM Forum/94–0325, Apr. 28, 1994.

Rob Coltun et al., PRP: A P–NNI Routing Protocol Proposal, ATM Forum Technical Committee ATM_Forum/94–0492, Apr. 28, 1994.

Richard Bubenik et al., Leaf Initiated Join Extensions, ATM Forum Technical Committee, Signalling Subworking Group, ATM Forum 94–0325, Apr. 28, 1994.

Richard Bubenik et al., Requirements For Phase 2 Signaling Protocol, ATM Forum Technical Committee, Signalling Subworking Group, ATM Forum 94–1078, Jan. 1, 1994.

SITA, ATM RFP: C–Overall Technical Requirements, Sep. 1994.

ALLOCATED AND DYNAMIC SWITCH FLOW CONTROL

RELATED APPLICATION

This application claims benefit of U.S. Provisional Application Ser. No. 60/001,498, filed Jul. 19, 1995.

FIELD OF THE INVENTION

The present invention is generally related to telecommunications networks, and more particularly to reduction of cell loss in network switches.

BACKGROUND OF THE INVENTION

Networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

One problem associated with ATM networks is loss of cells. Cells are buffered within each switch before being routed and transmitted from the switch. More particularly, switches typically have buffers at either the inputs or outputs of the switch for temporarily storing cells prior to transmission. As network traffic increases, there is an increasing possibility that buffer space may be inadequate and data lost. If the buffer size is insufficient, cells are lost. Cell loss causes undesirable interruptions in audio and video data transmissions, and may cause more serious damage to other types of data transmissions. Avoidance of cell loss is therefore desirable.

SUMMARY OF THE INVENTION

A method and apparatus are disclosed for eliminating cell loss within a network switch through the use of flow control. The switch includes at least one input port, at least one output port, and input and output buffers associated with the respective input and output ports. Cells enter the switch through the input port and are buffered in the input buffers. The cells are then transmitted from the input buffers to the output buffers, and then transmitted to the output port. When the output buffers become filled to a predetermined threshold level, a feedback message is provided to the input buffers to prevent transmission of cells from the input buffers to the output buffers. Hence, cell loss between the input buffer and the output buffer is prevented by flow control.

In order to provide both connection and traffic type isolation, the buffers are grouped into queues and flow control is implemented on a per queue basis. Each queue includes multiple buffers, and each switch includes multiple input queues and multiple output queues. Upon entering the switch, each cell is loaded into a particular input queue for eventual transmission to a particular output queue. Individual queues are then assigned to traffic type groups in order to provide traffic type flow control if shared resources are being utilized. In an alternate implementation, each queue could be dedicated to a particular traffic type (sometimes referred to as a service class) such as the variable bit rate ("VBR") service class and the available bit rate ("ABR") service class. Flow control can then be implemented on a per traffic type basis. Further, flow control can be implemented on traffic sub-types and queues where each queue may be assigned to a particular connection, thereby providing flow control on a per connection as well as traffic subtype basis. Table 1 below shows possible flow control configurations.

TABLE 1

| CONNECTION FLOW CONTROL | TRAFFIC TYPE FLOW CONTROL |
| --- | --- |
| No | No |
| Yes | No |
| No | Yes |
| Yes | Yes |

Each connection is assigned bandwidth types based on the traffic type associated with the connection. There are two types of bandwidth to grant within the switch: allocated and dynamic. Allocated bandwidth is bandwidth which is "reserved" for use by the connection to which the bandwidth is allocated. Generally, a connection with allocated bandwidth is guaranteed access to the full amount of bandwidth allocated to that connection. As such, traffic types that need deterministic control of delay are assigned allocated bandwidth. Dynamic bandwidth is bandwidth which is "shared" by any of various competing connections. Because dynamic bandwidth is a shared resource, there is generally no guarantee that any particular connection will have access to a particular amount of bandwidth. For this reason dynamic bandwidth is typically assigned to connections with larger delay bounds. Other connections may be assigned a combination of dynamic and allocated bandwidth.

A digital feedback message with first and second bits is provided to facilitate flow control. The feedback message may include an ACCEPT message which can be sent from the output queue to the input queue. More particularly, using the first bit of the feedback message, first bit=0 indicates an ACCEPT of an input queue request to transfer a cell to the output queue. When ACCEPT is received by the requesting input queue, the cell is transferred to the output queue.

The feedback message may also include a REJECT message. When REJECT is received by the requesting input queue, the cell is not transferred. However, further requests to transfer may be sent by the input queue.

The feedback message may also include a NO-OP/XOFF message. An XOFF message can be received while transmitting via allocated bandwidth or dynamic bandwidth. In particular, an XOFF (allocated) message may be received with regard to allocated bandwidth and an XOFF (dynamic) message may be received with regard to dynamic bandwidth. An optional tagging technique may be employed to distinguish between requests for dynamic and allocated bandwidth.

The XOFF (dynamic) message temporarily halts transmission of requests to transfer via dynamic bandwidth. Each input queue receiving XOFF (dynamic) from a particular output queue temporarily ceases submitting requests to transmit to that particular output queue via dynamic bandwidth until a specified event occurs. The specified event could be passage of a predetermined amount of time or receipt of an XON signal which enables further requests to transfer to be sent. The input queues could also be enabled with an XON signal on a regular basis, i.e., without regard to when each particular input queue was placed in the XOFF (dynamic) state. Such a regular basis could be, for example, every 100 msec. When the second bit of the two bit message equals 0, such indicates an NO-OP (no operation) signal. Each input queue receiving a NO-OP signal is not disabled.

The XOFF (allocated) feedback message temporarily halts transmission of requests to transfer via allocated bandwidth. Each input queue receiving XOFF (allocated) from a particular output queue temporarily ceases submitting requests to transmit to that particular output queue via allocated bandwidth until a specified event occurs. The specified event is typically receipt of an XON signal which enables further requests to transfer to be sent. The input queues could also be enabled with an XON signal on a regular basis, i.e., without regard to when each particular input queue was placed in the XOFF (allocated) state. Such a regular basis could be, for example, every 100 msec. When the second bit of the two bit message equals 0, such indicates an NO-OP signal. Each input queue receiving a NO-OP (no operation) signal is not disabled.

In the preferred embodiment an XON signal is used to enable input queues which have been placed in either XOFF state. Each input queue receiving XON from a particular output queue is enabled to submit requests to transmit to that output queue. More particularly, the XON resets both the XOFF (dynamic) and XOFF (allocated) states. The XON signal can be used in conjunction with enabling on a regular basis to both reduce unnecessary switch traffic and prevent flow blockage due to errors.

It will be apparent that various combinational responses to a request to transmit may be received by the requesting input queue. Receipt of NO-OP and either ACCEPT or REJECT operates as described above. Receipt of either XOFF (dynamic) and ACCEPT or XOFF (allocated) and ACCEPT indicates that further requests to transfer via the designated bandwidth type should cease following transfer of one cell. Receipt of XOFF (dynamic) and REJECT or XOFF (allocated) and REJECT indicates that further requests to transfer via the designated bandwidth type should cease immediately and no cells may be transmitted. Thus, the XOFF commands effect future requests while the REJECT command provides for denial of the current request.

The NO-OP/XOFF (dynamic) message is employed to reduce unnecessary feedback signaling within the switch. Switch bandwidth is inefficiently used when REJECT is repeatedly asserted when a cell can not be transmitted through the switch. XOFF (dynamic) is thus used to modify To Switch Port Processor ("TSPP") behavior to reduce the number of requests made to a full From Switch Port Processor ("FSPP") queue.

Flow control with the feedback messages described above provides reliable point-to-multipoint transmission within the switch, i.e., transmission from a single input queue to multiple output queues. In point-to-multipoint operation the feedback messages from the multiple output queues to the single input queue are logically OR'd such that a single XOFF (dynamic) or REJECT message from any one of the plurality of output queues prevents transmission. Thus, point-to-multipoint cells are transmitted at the rate of the slowest destination queue.

Flow control with the two bit feedback messages described above also provides reliable multipoint-to-point transmission within the switch, i.e., transmission from multiple input queues to a single output queue. Each output queue has a threshold, and sends the XON message when the output queue drains to that threshold. In multipoint-to-point operation, the XON threshold of the output queue is dynamically set to reserve sufficient space for each input queue to transmit to the output queue. For example, if there are eight input queues then the threshold is set to eight so that the output queue will free sufficient space to receive all of the cells contemporaneously in serial fashion.

BRIEF DESCRIPTION OF THE DRAWING

These and other features of the present invention will be more apparent from the following detailed description in conjunction with the drawing of which.

DETAILED DESCRIPTION OF THE DRAWING

Figure 1:
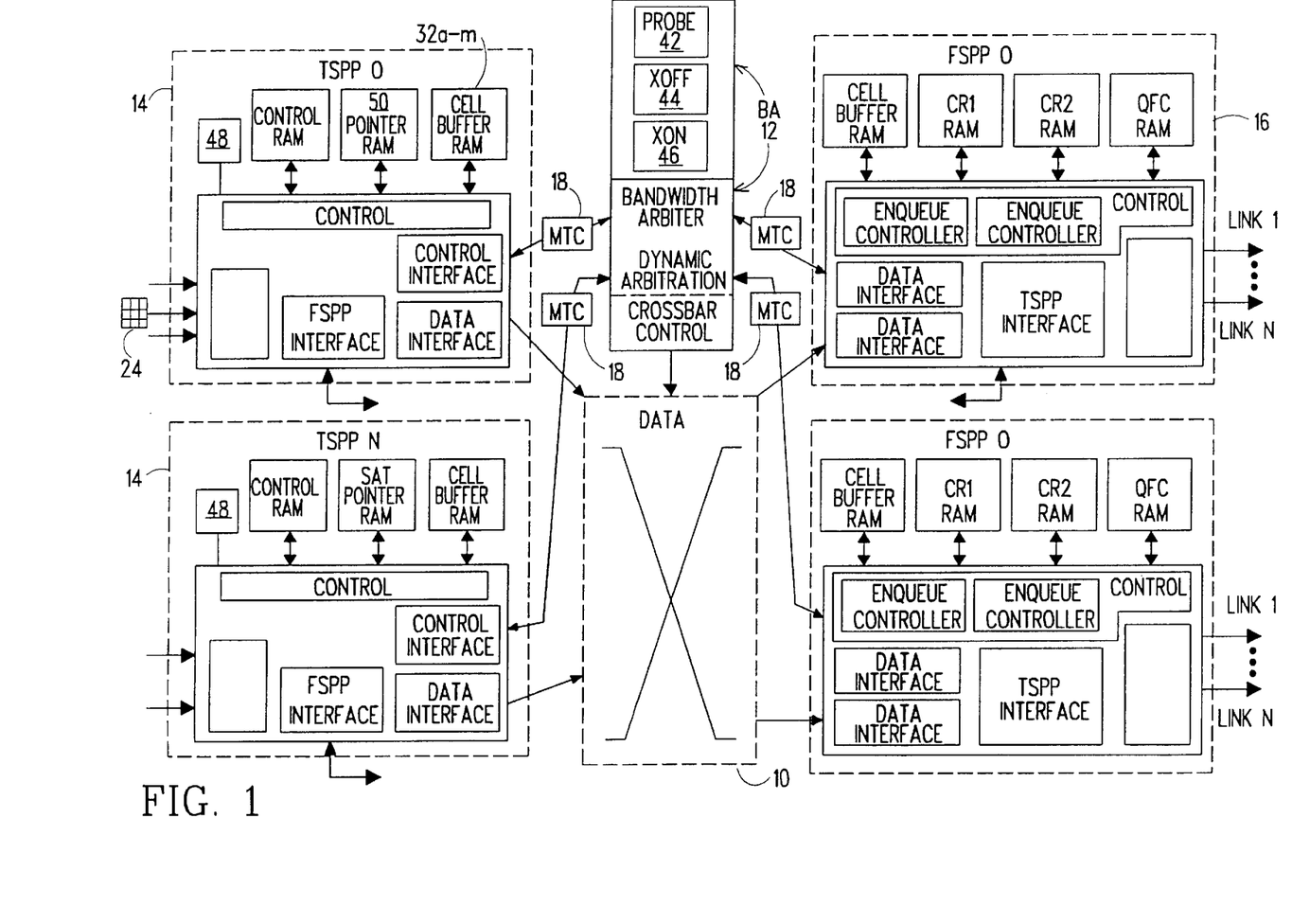
FIG. 1 is a switch interconnect block diagram.

Referring now to FIG. 1, the switch includes an N×N switch fabric 10, a bandwidth arbiter 12, a plurality of To Switch Port Processor subsystems ("TSPP") 14, a plurality of To Switch Port Processor ASICs 15, a plurality of From Switch Port Processor subsystems ("FSPP") 16, a plurality of From Switch Port Processor ASICs 17 and a plurality of multipoint topology controllers 18. The N×N switch fabric, such as an ECL cross point switch fabric, is used for cell data transport, and yields N times 670 Mbps throughput. The bandwidth arbiter controls switch fabric interconnection, dynamically schedules unassigned bandwidth and resolves multipoint-to-point bandwidth contention. Each TSPP schedules transmission of cells to the switch fabric from multiple connections. Not shown are the physical line interfaces between the input link and the TSPP subsystem. The FSPP receives cells from the switch fabric and organizes those cells onto output links. Not shown are the physical line interfaces between the output link and the FSPP subsystem.

Figure 2:
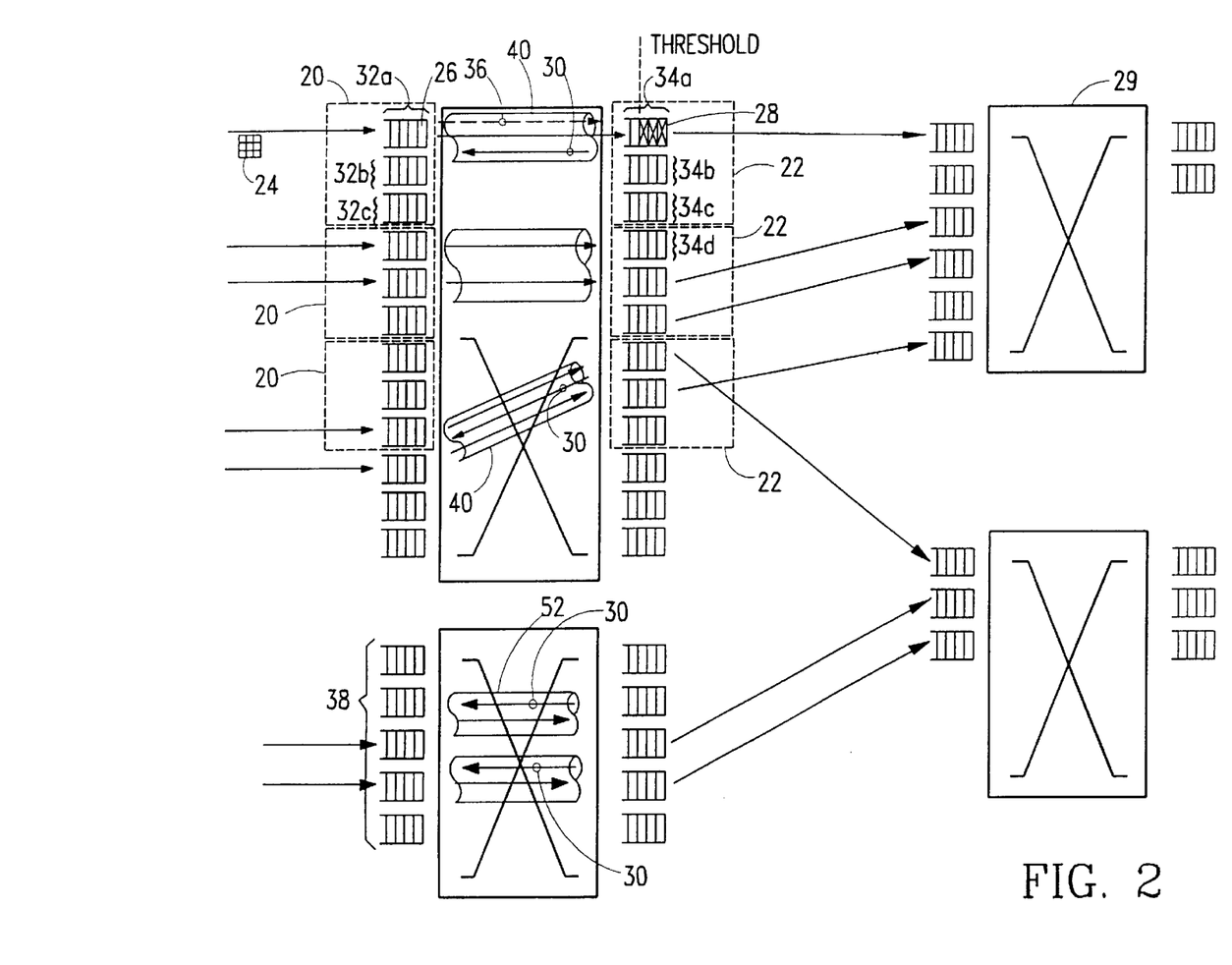
FIG. 2 is a block diagram illustrating point-to-point operation, switch flow control and link flow control.

Referring now to FIG. 2, the switch includes a plurality of input ports 20, a plurality of output ports 22, and input buffers 26 and output buffers 28 associated with the input ports and output ports, respectively. To traverse the switch, a cell 24 enters the switch through an input port and is buffered in the input buffers. The cell is then transmitted from the input buffers to output buffers in an output port. From the output port the cell is transmitted outside of the switch, for example, to another switch 29. In response to a transfer request, if the output buffers become filled to a predetermined threshold level a feedback message 30 is provided to the input ports to prevent transmission of cells from the input ports to the output buffers.

The feedback message 30 prevents cell loss within the switch. If the number of cells 24 transmitted to the output buffers is greater than the number of available output buffers 28 then cells are lost. However, in response to a transfer request, when the output buffers 28 become filled to the threshold level the feedback message is transmitted to the input ports 20 to prevent transmission of cells from the input buffers. The threshold level is set to a value which prevents transmission of more cells than can be handled by the available output buffers. Hence, cell loss between the input buffers and the output buffers is prevented by the flow control feedback message.

In order to provide both connection and traffic type isolation the buffers 26, 28 are organized into queues 32, 34 respectively and flow control is implemented on a per queue basis. Each queue includes multiple buffers, and each input port and output port includes multiple input queues 32 and multiple output queues 34. Upon entering the switch, each cell 24 is loaded into a particular input queue 32 for eventual transmission to a particular output queue 34. The queues are also assigned to traffic type groups in order to provide traffic type flow control if shared resources are being utilized. By assigning a unique queue per connection, flow control can then be implemented on a per connection basis. In addition, nested queues of queues may be employed to provide per traffic type, per connection flow control.

For multipoint topologies multiple queues may be required per connection, and indirection utilized to implement per connection flow control. At the TSPP when there are multiple sources for a multipoint connection the multiple queues are nested into a scheduling list 48. At the TSPP when there is a single source a scheduling list is still employed, but having a single queue. A scheduling list is effectively a queue of queues where the queues have cells to be transmitted for that connection, and there is a scheduling list for each connection at the TSPP and the TSPP supports multiple connections. Hence, a scheduling list may be considered an input queue, and the terms are hereafter used synonymously.

Each connection is assigned bandwidth types based on the traffic type associated with the connection. There are two types of bandwidth to grant within the switch: allocated and dynamic. Allocated bandwidth is bandwidth which is "reserved" for use by the connection to which the bandwidth is allocated. Generally, a connection with allocated bandwidth is guaranteed access to the full amount of bandwidth allocated to that connection. As such, traffic types that need deterministic control of delay are assigned allocated bandwidth. Dynamic bandwidth is bandwidth which is "shared" by any of various competing connections. Because dynamic bandwidth is a shared resource, there is generally no guarantee that any particular connection will have access to a particular amount of bandwidth. For this reason dynamic bandwidth is typically assigned to connections with larger delay bounds. Other connections may be assigned a combination of dynamic and allocated bandwidth.

In order to distinguish between cells associated with connections utilizing dynamic bandwidth, allocated bandwidth, or both, each transfer request is tagged. More particularly, transfer requests of a connection utilizing dynamic bandwidth are tagged with a bit in a first state and transfer requests of a connection utilizing allocated bandwidth are tagged with the bit in a second state. If the connection is above the allocated cell rate then the transfer request is tagged as dynamic. If the connection is operating at or below the allocated cell rate then the transfer request is tagged as allocated.

TABLE 2

| Bit 1 | Bit 2 | Meaning |
| --- | --- | --- |
| 0 | 0 | ACCEPT, NO-OP |
| 0 | 1 | ACCEPT, XOFF (dynamic) |
| 1 | 0 | REJECT, NO-OP |
| 1 | 1 | REJECT, XOFF (dynamic) |

Referring now to FIG. 1, FIG. 2 and Table 2, the feedback message 30 is provided in response to a request message 36. Prior to transmitting a cell from an input port 20 to an output port 22 the request message including the allocated/dynamic tag is sent from the input port to the output port to determine whether sufficient buffers 28 are available in the output port. The feedback message 30 provides an indication of buffer status at the output port, and transmission proceeds accordingly. The request message 36 always precedes cell transfer within the switch so that cells are only transferred under selected conditions.

In order to provide efficient flow control the feedback message 30 from the output port to the input port includes several sub-type messages. For example, the feedback message includes an ACCEPT message which may be sent in response to the request message. Using a one bit digital signal, a first bit=0 indicates an ACCEPT of an input queue request to transfer a cell to a particular output queue. When ACCEPT is received by the requesting input queue, the cell is transferred to the output queue.

The feedback message 30 also includes a REJECT message. More particularly, the response to the request message includes either an ACCEPT or REJECT message. Using the one bit digital signal, a first bit=1 indicates a REJECT of the request to transfer a cell to the output queue. When REJECT is received by the requesting input queue, the cell is not transferred to the output queue. However, further request messages 36 may be sent from the input queue to the output queue.

In order to reduce unnecessary message traffic the feedback message 30 may also include an XOFF (dynamic) message which temporarily halts transmission of request messages 36 via dynamic bandwidth. Using a second bit of a two bit digital feedback signal, a second bit=1 indicates XOFF (dynamic). Each input queue 32 receiving XOFF (dynamic) from a particular output queue 34 temporarily ceases transmission of request messages for dynamic bandwidth to that particular output queue until a specified event occurs. The specified event could be passage of a predetermined interval of time or receipt of another signal. A second bit=0 indicates a NO-OP, i.e., a no operation message meaning that XOFF (dynamic) has not been asserted.

The feedback message may also include an XOFF (allocated) feedback message. Each input queue receiving XOFF (allocated) from a particular output queue temporarily ceases submitting requests to transmit to that particular output queue via allocated bandwidth until a specified event occurs. The specified event is typically receipt of an XON signal which enables further requests to transfer to be sent. The input queues could also be enabled with an XON signal on a regular basis, i.e., without regard to when each particular input queue was placed in the XOFF (allocated) state. Such a regular basis could be, for example, every 100 msec.

In practice the request tagging technique allows use of a single XOFF message to designate either XOFF (dynamic) or XOFF (allocated). The request tagging technique tags requests for bandwidth with a tag bit based upon whether the request is for dynamic or allocated bandwidth. The tag bit thus distinguishes allocated and dynamic requests and feedback, i.e., the XOFF transmitted in response to a request for dynamic bandwidth is XOFF (dynamic).

Utilizing the two bit feedback message, various responses to each request message may be received by the requesting input queue. Such responses are interpreted as follows. Receipt of NO-OP and either ACCEPT or REJECT operates as described above. Receipt of XOFF (dynamic) and ACCEPT indicates that further requests to transfer should cease following transfer of one cell. Receipt of XOFF (dynamic) and REJECT indicates that further requests to transfer should cease immediately and no cells may be transmitted. Thus, the XOFF (dynamic) command effects future requests while the REJECT command provides for denial of the current request.

The feedback message 30 may also include an XON message which enables further transmission of request messages. The XON message occurs asynchronously to the request to transfer messages, and is not provided in response thereto. The XON message is effective to remove both XOFF conditions. Each input queue receiving XON from a particular output queue is enabled to submit requests to transmit to that output queue.

In order to reduce the likelihood of lockup in switch flow control it may be desirable to employ timeout type functions which will allow continued operation despite the removal or failure of internal elements such as ports. For example, an input queue 32 which has ceased transmission of request messages to a particular output queue 34 following receipt of an XOFF (dynamic or allocated) message may transmit a further request message to that output queue if an XON message is not received from that output queue within a predetermined interval of time. Alternatively, input queues may periodically transmit request messages regardless of XOFF (dynamic or allocated) state.

Referring again to FIG. 1, the invention will now be described in greater detail. In the preferred architecture each input port includes a TSPP 14, and each output port includes an FSPP 16. The TSPPs and FSPPs each include cell buffer RAM which is organized into queues 32, 34, respectively. All cells in a connection 40 pass through a single queue at each port, one at the TSPP and one at the FSPP, for the life of the connection. The queues thus preserve cell ordering. This strategy also allows quality of service ("QoS") guarantees on a per connection basis.

The request message 36 is a probe which is sent to the FSPP 16 from the TSPP 14 to determine whether sufficient buffers 34 are available for cell transmission. In order to guarantee no cell loss within the switch a TSPP cannot transmit a cell to an FSPP unless there is buffer space available for that cell. To determine buffer status, the probe communicates destination multiqueue numbers which indicate the FSPP queue or queues to which the cell is to be transmitted. For example, a destination multiqueue number could identify output queue 34a as the destination queue. When buffer space is not available in that queue, the FSPP responds to the probe with either or both of the "REJECT" and "XOFF (dynamic or allocated)" messages, as will be described below.

Three communication paths are used to implement the probe and feedback messages of switch flow control: a Probe Crossbar 42, an XOFF Crossbar 44 and an XON Crossbar 46. The Probe Crossbar 42 is an N×N crosspoint switch fabric which is used to transmit an FSPP multiqueue Number to each FSPP. The multiqueue number identifies a plurality of destination queues for the cell for use in point-to-multipoint connections. The FSPP uses the multiqueue number to direct the probe 36 to the appropriate output queue or queues 34 and thereby determine if there are enough output buffers available in the destination queues for receipt of the cell or cells. There is a unique multiqueue number per connection per FSPP with multiple multiqueue numbers in the case of point-to-multipoint.

The XOFF Crossbar 44 is an N×N serial crosspoint switch fabric which is used to communicate "Don't Send" type messages from the FSPP 16 to the TSPP 14. Each TSPP includes multiple scheduling lists 48 which have queues of cells to be transmitted for each connection. The first bit of the feedback message 30, namely XOFF, is asserted to halt transmission of request message probes 36 from a particular TSPP's scheduling list, and is thus a state control bit which puts the receiving TSPP's scheduling list in an XOFF state, meaning that this TSPP's scheduling list 48 will not use dynamic bandwidth. This TSPP's Scheduling List then remains in the XOFF state until receiving an XON message. The second bit, namely REJECT, is asserted when insufficient buffer space is available to receive the cell in the FSPP. This situation may result from the FSPP destination queue being full or from the entire pool of output buffers being exhausted. The TSPP responds to an asserted REJECT feedback message by not dequeueing the cell 24 through the data crossbar 47. An idle cell denoted by a complemented CRC, is transmitted instead. The TSPP responds to an asserted XOFF (dynamic) feedback message by modifying the TSPP's scheduling list XOFF state bits. The XOFF state bits prevent the TSPP from attempting to send a request message from that queue on that Scheduling List until notified by the FSPPs that cell buffers are available.

The XON Crossbar 46 is an N×N serial contention-based switch which is used to communicate "Enable Send" type messages. More particularly, the XON Crossbar is employed to communicate the XON message from the FSPP to the TSPP. When the number of buffered cells in the FSPP queue drops below an XON threshold, the XON message is sent from the FSPP to the TSPP. The XON message enables the TSPP Scheduling List to resume sending request messages.

Figure 3:
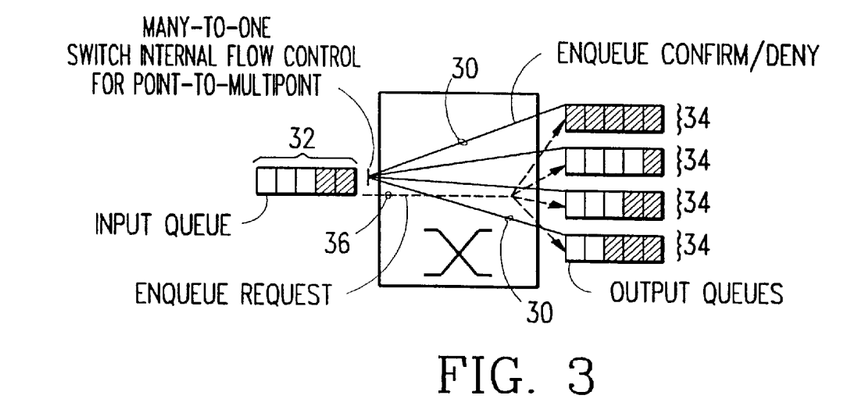
FIG. 3 is a block diagram illustrating point-to-multipoint operation.

FIG. 3 illustrates point-to-multipoint switch flow control, i.e., transmission from a single input queue 32 to multiple output queues 34. In point-to-multipoint operation the XOFF crossbar performs a logical OR function. More particularly, the XOFF crossbar performs a logical OR of the feedback messages 30 asserted by the FSPPs to provided a single feedback message. As a result, receipt of REJECT or XOFF from any FSPP will cause the single resultant feedback message to be interpreted as asserting REJECT and/or XOFF respectively. This technique limits the TSPP to transmission at the rate of the slowest destination queue. However, the technique also provides desirable contemporaneous serial transmission of cells.

In the case of point-to-multipoint transmission it will be noted that a TSPP may receive multiple XON messages. Such is true because multiple XOFFs could be set by the FSPPs, i.e., more than one FSPP can assert XOFF on a transfer request. In such a case, XON messages received when the TSPP scheduling list XOFF state is clear are ignored. For example, when multiple XON messages are sent, the TSPP ignores the XONs received after the first received XON message. In the case of multipoint-to-point transmission the XON message is sent simultaneously to all TSPPs with scheduling lists transferring to an FSPP queue.

Figure 4:
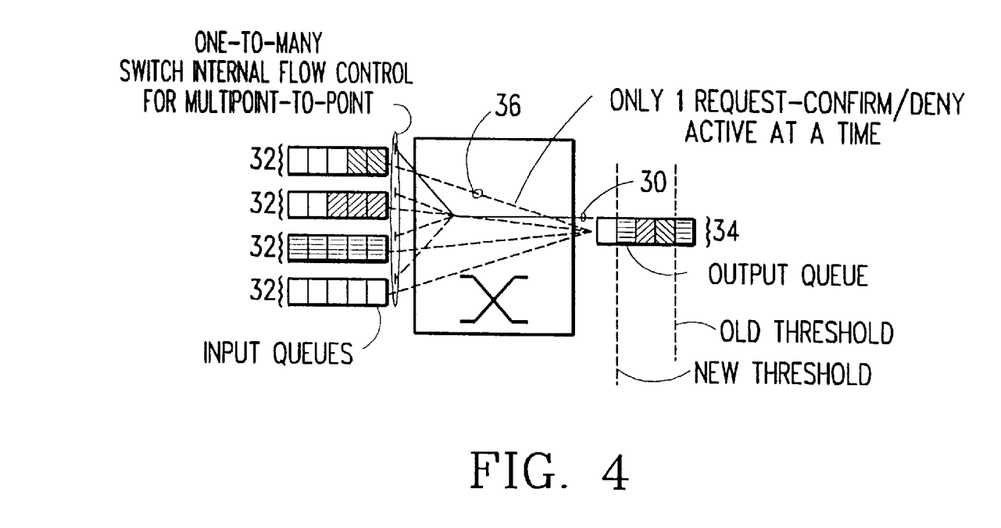
FIG. 4 is a block diagram illustrating multipoint-to-point operation.

FIG. 4 illustrates multipoint-to-point switch flow control, i.e., transmission from multiple input queues 32 to a single output queue 34. Each output queue has a threshold, and the XON message is sent when the output queue drains below that threshold. In multipoint-to-point operation, the XON threshold of the output queue is dynamically set to reserve enough buffers for each input queue to transmit to the output queue. For example, if eight queues are transmitting, the threshold is set to eight so that the output queue will free sufficient buffers to receive all eight of the cells contemporaneously in serial fashion, and thereby insuring that each queue has an opportunity to transmit.

Referring now to FIGS. 1 and 4, in the case of multipoint-to-point connections, the XON crossbar 46 is used to broadcast to all TSPPs in the switch, regardless of whether or not any of the TSPPs were transmitting to the asserting FSPP queue. For the broadcast, the multipoint topology controller 18 transmits a reverse broadcast channel number on behalf of the FSPP. The receiving multipoint topology controller then performs a reverse broadcast channel to scheduling list number lookup to determine which scheduling list 48 to enable. Any TSPPs without queues transmitting to that particular FSPP queue are unaffected by the broadcast XON message since the reverse broadcast channel number lookup entry will be marked invalid.

Referring again to FIG. 2, an additional flow control enhancement provides for the queues to be organized on an hierarchical basis with multiple individual flows 52 at each hierarchical level and the feedback message 30 from the output queues to the input queues is made on the basis of the combined flow at each of the hierarchical levels. Still another enhancement provides for the queues to be organized on an hierarchical basis with multiple individual flows at each of the hierarchical levels and the feedback message from the output queues to the input queues is made on the basis of each of the individual flows.

The Probe & XOFF communication paths operate in a pipeline fashion. First, the TSPP 14 selects an input queue 34, and information associated with that queue is used to determine output ports for transmission, i.e., a destination output queue. The bandwidth arbitrator reduces this information to a TSPP to FSPP connectivity map which is employed to control the Probe, XOFF, and data cross-points in sequence. More particularly, the FSPP multiqueue number is transmitted to the FSPP using the Probe crossbar 42. The FSPP then tests for buffer availability, and asserts REJECT and/or XOFF on the XOFF crossbar 44 if sufficient buffers are not available. The TSPP then transmits an idle cell if REJECT was asserted. If XOFF was asserted, the TSPP puts the Scheduling List into the XOFF state. If sufficient buffers are available, the TSPP transmits the cell to the FSPP output queue through the data crossbar 47.

TABLE 3

| Traffic Type Cell Count ≧ Limit | Queue's Dynamic Buffer Count ≧ Limit | Assert XOFF | Assert REJECT |
| --- | --- | --- | --- |
| No | No | 0 | 0 |
| No | Yes | 1 | 1 |
| Yes | No | 0 | 1 |
| Yes | Yes | 1 | 1 |

0 = not asserted
1 = asserted

Table 3 summarizes the policies used by the FSPP to assert REJECT and XOFF in response to requests tagged as utilizing dynamic bandwidth. The policies are based upon two relationships: the traffic type cell count in relation to the cell count limit and the queue's dynamic buffer count in relation to the buffer count limit. The traffic type cell count is a count of all cells shared by connections within a traffic type, e.g., "VBR." When the limits are not exceeded, neither REJECT nor XOFF (dynamic) is asserted. More particularly, when the traffic type cell count not greater than or equal to the limit, and the queue's dynamic buffer count is not greater than or equal to the limit, neither REJECT nor XOFF (dynamic) is asserted. When the traffic type cell count is not greater than or equal to the limit but the queue's dynamic buffer count is greater than or equal to the limit, both REJECT and XOFF (dynamic) are asserted. When the traffic type cell count is greater than or equal to the limit and the queue's dynamic buffer count is not greater than or equal to buffer limit XOFF is not asserted but REJECT is asserted. When the traffic type cell count is greater than or equal to the limit and the queue's dynamic buffer count greater than or equal to the limit both REJECT and XOFF are asserted.

TABLE 4

| Queue's Allocated Buffer-State Count ≧ Limit | Traffic Type Cell Count ≧ Limit | Queue's Allocated Buffer Count ≧ Limit | Assert XOFF | Assert REJECT |
| --- | --- | --- | --- | --- |
| No | No | No | 0 | 0 |
| No | No | Yes | 1 | 1 |
| No | Yes | No | 0 | 1 |
| No | Yes | Yes | 1 | 1 |
| Yes | No | No | 0 | 1 |
| Yes | No | Yes | 1 | 1 |
| Yes | Yes | No | 0 | 1 |
| Yes | Yes | Yes | 1 | 1 |

1 = asserted
0 = not asserted

Table 4 summarizes the policies used by the FSPP to assert REJECT and XOFF in response to requests tagged to use allocated bandwidth. The policies are based upon three relationships: the queue's allocated buffer-state count in relation to the buffer-state count limit, the traffic type cell count in relation to the cell count limit, and the queue's allocated buffer count in relation to the buffer count limit. Link flow control uses a buffer-state counter to indicate cells in flight. The allocated buffer-state counter is used to track cells in flight for the allocated component of a connection using link flow control. Neither XOFF nor REJECT are asserted if the queue's allocated buffer-state count is greater than or equal to the count limit, the traffic type cell count is greater than or equal to the cell count limit, and the queue's allocated buffer count is greater than or equal to the count limit. Both XOFF and REJECT are asserted if the queue's allocated buffer count is greater than or equal to the buffer count limit. If the queue's allocated buffer count is not greater than or equal to the count limit, but either the queue's allocated buffer-state count is greater than or equal to the count limit or the traffic type cell count is greater than or equal to the cell count limit then REJECT is asserted and XOFF is not asserted. In all cases, if an FSPP queue has already sent an XOFF, that queue will reassert XOFF on the next probe.

It will be understood that various changes and modifications to the above described method and apparatus may be made without departing from the inventive concepts disclosed herein. Accordingly, the present invention is not to be viewed as limited to the embodiments described herein.

What is claimed:

1. A method for controlling flow of a data unit within a network switch, comprising the steps of:

receiving the data unit in the switch, the data unit being received at an input port associated with an input queue, the input queue associated with at least one input buffer;

storing the data unit in the at least one input buffer associated with the input queue;

forwarding a request to transmit the data unit to at least one output buffer associated with an output queue, the output queue associated with an output port;

providing, by the output port in response to the request to transmit, a feedback message to the input port indicating to cease forwarding requests to transmit data units from the at least one input buffer associated with the input queue to the at least one output buffer associated with the output queue in the event that a total number of the output buffers associated with the output queue and available for data unit storage is less than a predetermined threshold; and ceasing forwarding requests to transmit data units from the at least one input buffer associated with the input queue to the at least one output buffer associated with the output queue, responsive to receiving the feedback message by the input port.

2. The method of claim 1 wherein a plurality of data units are received in a plurality of input queues and said forwarding a request step includes the further step of forwarding a request from each respective one of said plurality of input queues in receipt of at least one of said plurality of data units to respective ones of a plurality of output queues for which each respective one of said plurality of data units is destined, each request to transmit being specific to the respective input and output queues on a per transmission basis.

3. The method of claim 1 further comprising assigning the input queue and the output queue to a selected connection, whereby flow control is executed on a per connection basis.

4. The method of claim 1 wherein the feedback message includes a first signal indicating acceptance or rejection of the submitted request, the data unit being transmitted to the output queue if the first signal indicates acceptance, and not being transmitted to the output queue if the first signal indicates rejection.

5. The method of claim 4, wherein said transmitting includes transmitting the data unit to a plurality of output queues, wherein each such output queue is associated with a different output port.

6. The method of claim 4 further comprising assigning the input queue and the output queue to a selected service class, wherein each service class is associated with a transmission priority level and requests to transmit are accepted and rejected based at least in part on such priority level.

7. The method of claim 4 wherein at least one connection is established through the switch and including the further step of assigning the input queue and the output queue to a selected connection and a selected service class, wherein each service class is associated with a transmission priority level, whereby flow control is executed on a per connection, per service class basis, and requests to transmit are accepted and rejected based at least in part on such priority level.

8. The method of claim 4 wherein a subsequent request to transmit is forwarded after a delay if the first signal indicates rejection.

9. The method of claim 4 further comprising providing a second signal in the feedback message indicating either an instruction to cease forwarding requests to transmit or no operation as part of the feedback message, wherein each input queue receiving an instruction to cease forwarding requests to transmit ceases submitting requests to tranmit to such output queue having provided such instruction to cease forwarding requests to transmit.

10. The method of claim 9 wherein at least one inputted data unit is received in at least one input queue and said forwarding a request step includes the further step of forwarding a request from each respective input queue of the at least one input queue in receipt of the at least one inputted data unit to respective output queues of at least one output queue for which each respective inputted data unit of the at least one inputted data unit is destined, each request to transmit being specific to the respective input and output queues on a per transmission basis, and including, in the case of transmission from a single input queue to a plurality of output queues, the further step of performing a logical OR operation on the respective first and second signals of the feedback messages from the at least one output queue such that transmission from a single input queue to a plurality of output queues is contemporaneous.

11. The method of claim 10 including, in the case of transmission from a plurality of input queues to a particular output queue, the further step of setting the threshold to provide sufficient buffers for contemporaneous receipt of data units from the plurality of input queues.

12. The method of claim 9 including the further step of providing a third signal in a subsequent feedback message to countermand the instruction to cease forwarding requests to transmit by re-enabling the input queue to forward requests to transmit to the output queue when sufficient buffers become available for receipt of a predetermined number of data units by said output queue.

13. The method of claim 12 including the further step of providing the third signal upon dequeueing a data unit from the one of the at least one output queue.

14. The method of claim 12 including providing the third signal when the total number of output buffers available for data unit storage and associated with the output queue is greater than the predetermined threshold.

15. The method of claim 12 including the further step of providing the third signal to the input queue after passage of a predetermined period of time following transmission of the second signal.

16. The method of claim 12 including the further step of providing the third signal to the input queue on a periodic basis.

17. The method of claim 12 including the further step of providing the third signal from the output queue to a plurality of input queues.

18. The method of claim 1 including the further step of organizing the input buffers and output buffers into a hierarchy of levels with multiple individual flows of data units at each hierarchical level, wherein feedback messages are provided for each level based on combined flow at the respective level.

19. The method of claim 1 including the further step of organizing the input buffers and output buffers into a hierarchy of levels with multiple individual flows of data units at each hierarchical level, wherein feedback messages are provided for each individual flow.

20. The method of claim 1 wherein the request to transmit is a request to transmit utilizing dynamic bandwidth.

21. The method of claim 20, wherein the feedback message indicates to cease forwarding requests to transmit utilizing dynamic bandwidth to the output queue, and wherein the input queue, responsive to receiving the feedback message, ceases forwarding requests to transmit utilizing dynamic bandwidth to the output queue.

22. The method of claim 1 wherein the request to transmit is a request to transmit utilizing allocated bandwidth.

23. The method of claim 22, wherein the feedback message indicates to cease forwarding requests to transmit utilizing allocated bandwidth to the output queue, and wherein the input queue, responsive to receiving the feedback message, ceases forwarding requests to transmit utilizing allocated bandwidth to the output queue.

24. A network switch for controlling flow of at least one data unit within a telecommunications network, comprising:

at least one input port for receiving the at least one data unit into the switch;

at least one output port for transmitting the at least one data unit out of said switch;

at least one input buffer queue associated with said at least one input port for enqueuing the at least one data unit received at the at least one input port;

at least one output buffer queue associated with said at least one input buffer queue for receiving and temporarily storing the at least one data unit from said at least one input buffer queue;

at least one transmission request generator operative to generate one or more requests for permission to transmit the at least one data unit from said at least one input buffer queue to said at least one output buffer queue;

at least one feedback message generator operative to provide at least one feedback message to said at least one input buffer queue, said at least one feedback message including a signal having first and second states, said first and second states respectively indicating no operation and an instruction to cease sending requests for permission to transmit, and wherein each of said at least one input buffer queue receiving the signal in the second state from one or more of said at least one output buffer queue ceases submitting requests to transmit to said one or more of said at least one output buffer queue.

25. The switch of claim 24 wherein each one of said at least one output port includes one of said at least one feedback message generator.

26. The switch of claim 24 wherein a plurality of connections are established within the switch and each such connection utilizes one of said at least one input buffer queue and one of said at least one output buffer queue, whereby flow control is executed on a per connection basis.

27. The switch of claim 24 wherein one or more of said at least one input buffer queue and one or more of said at least one output buffer queue are assigned to a selected service class, whereby flow control is executed on a per service class basis.

28. The switch of claim 24 wherein a plurality of connections are established within the switch and each of said at least one input buffer queue and each of said at least one output buffer queue are assigned to a respective one of said plurality of connections and a selected service class, whereby flow control is executed on a per connection, per service class basis.

29. The switch of claim 24 including a logic circuit which, in the case of transmission from a single one of said at least one input buffer queue to a plurality of said at least one output buffer queue, performs a logical OR operation on the respective first and second signals of the feedback messages from said plurality of said at least one output buffer queue such that transmission from the single one of said at least one input buffer queue to the plurality of said at least one output buffer queue is serially contemporaneous.

30. The switch of claim 25 wherein, in the case of transmission from a plurality of said at least one input buffer queue to a particular one of said at least one output buffer queue, a dynamically adjustable threshold at which the first signal in the second state is provided in connection with the particular one of said at least one output buffer queue is increased in order to provide sufficient buffers for contemporaneous receipt of the at least one data unit from the plurality of said at least one input buffer queue.

31. The switch of claim 20 wherein said at least one input buffer queue and said at least one output buffer queue are each arranged in a hierarchy of levels with multiple individual flows of data units at each hierarchical level, said at least one feedback message being provided for each level based on combined flow at the respective level.

32. The switch of claim 24 wherein said at least one input buffer queue and said at least one output buffer queue are each arranged into a hierarchy of levels with multiple individual flows of data units at each hierarchical level, an individual one of said at least one feedback message being provided for each individual flow.

33. The network switch of claim 24, said at least one feedback message further comprising a second signal having a first state and a second state, wherein said first state indicates a grant of permission to transmit the at least one data unit from one or more of the at least one input buffer queue where the data unit is enqueued to one or more of said at least one output buffer queue and said second state indicates a denial of permission to transmit the enqueued data unit from the one or more of the at least one input buffer queue to said one or more of said at least one output buffer queue.

34. The switch of claim 32 wherein said at least one feedback message generator provides said at least one feedback message in response to said one or more requests for permission to transmit.

35. The switch of claim 32 wherein the at least one data unit is transmitted if the second signal indicates that permission to transmit is granted and the at least one data unit is not immediately transmitted if the second signal indicates that permission to transmit is denied.

36. The switch of claim 33 wherein a third signal is provided in said at least one feedback message to countermand the first signal in the second state by re-enabling one or more of said at least one input buffer queue to forward permission requesting signals to said one or more of said at least one output buffer queue.

37. The switch of claim 36 wherein said third signal is provided upon dequeueing a data unit from said one or more of said at least one output buffer queue.

38. The switch of claim 36 wherein a threshold is set in said one or more of said at least one output buffer queue, said third signal being provided when a total number of output buffers available to store said at least one data unit in said one or more of said at least one output buffer queue is greater than said threshold.

39. The switch of claim 31 wherein said third signal is provided to said one or more of said at least one input buffer queue after passage of a predetermined period of time following receipt of said second signal in the second state.

40. The switch of claim 31 wherein said third signal is provided to said one or more of said at least one input buffer queue on a regular time basis.

41. The switch of claim 31 wherein said third signal is provided from said one or more of said at least one output buffer queue to a plurality of said at least one input buffer queue.

42. A method for controlling flow of at least one inputted cell within a network switch having a plurality of input buffers associated with at least one input queue and a plurality of output buffers associated with at least one output queue, the method comprising the steps of:

receiving the at least one inputted cell in the switch, the cell being received in the input queue of the input memory;

forwarding a request to transmit the at least one inputted cell to one of said at least one output queue; and asserting, when a traffic type cell count of all cells shared by all existing connections is not greater than or equal to a first limit and a dynamic buffer count associated with one of said at least one output queue is greater than or equal to a second limit, both a first signal denying said request and a second signal causing cessation of forwarding requests to transmit to the one output queue.

43. The method of claim 42 including the further step of, when the traffic type cell count is not greater than or equal to the first limit and the dynamic buffer count associated with the one output queue is not greater than or equal to the second limit, asserting neither the first signal nor the second signal.

44. The method of claim 43 including the further step of, when the traffic type cell count is greater than or equal to the first limit and the dynamic buffer count associated with the one output queue is not greater than or equal to the second limit, not asserting the second signal and asserting the first signal.

45. The method of claim 44 including the further step of, when the traffic type cell count is greater than or equal to the first limit and the dynamic buffer count associated with the one output queue is greater than or equal to the second limit, asserting both the first signal and the second signal.

46. The method of claim 45 including the further step of, asserting neither the first signal nor the second signal when an allocated buffer-state count associated with the one output queue is greater than or equal to a second imit, the traffic type cell count is greater than or equal to the first limit, and an allocated buffer count is greater than or equal to a third limit.

47. The method of claim 46 including the further step of asserting both the first signal and the second signal when the allocated buffer count is greater than or equal to the third limit.

48. The method of claim 47 including the further step of, when the allocated buffer count is not greater than or equal to the third limit, but either the allocated buffer-state count is greater than or equal to the second limit or the traffic type cell count is greater than or equal to the first limit, asserting the second signal and not asserting the first signal.

49. The method of claim 48 including the further step of, when an output queue has already asserted the first signal, reasserting the first signal on a subsequent probe.

50. A system for controlling flow of a received data unit in a network switch, comprising:

an input queue associated with a receive buffer for storing the received data unit, the input queue associated with an input port, a first traffic type, and a first connection;

a plurality of traffic type output queues associated with an output port, each one of the plurality of traffic type output queues further associated with a respective traffic type, each one of the traffic type output queues including a plurality of connection specific output queues; and a feedback message generator operative to determine whether there is insufficient buffer space in one of the connection specific output queues associated with the first connection included in one of the traffic type output queues associated with the first traffic type and the first output port, the feedback message generator further operative to provide a first feedback message to the input queue responsive to determining there is insufficient buffer space in the one of the connection specific output queues associated with the first connection included in the one of the traffic type output queues associated with the first traffic type and the first output port.

51. The system of claim 50, wherein the first feedback message denies a request to transmit the received data unit.

52. The system of claim 50 wherein the input queue is one of a plurality of input queues associated with the input port.

53. The system of claim 50 wherein the first traffic type is variable bit rate.

54. The system of claim 50 wherein the first traffic type is constant bit rate.

55. The system of claim 50 wherein the first traffic type is available bit rate.

56. The system of claim 50 wherein said feedback message generator is further operative to provide a second feedback message to the input queue responsive to determining there is sufficient buffer space in the one of the connection specific output queues associated with the first connection.

57. The system of claim 56, wherein the second feedback message enables transmission of the received data unit to the one of the connection specific output queues associated with the first connection.

58. A method for controlling flow of a data unit within a network switch, comprising:

receiving the data unit in the switch, the data unit being received at an input port associated with an input queue, the input queue associated with at least one input buffer;

storing the data unit in the at least one input buffer associated with the input queue;

at least at some times, forwarding a plurality of requests to transmit the data unit from the input port to a plurality of output queues, the plurality of output queues associated with a respective plurality of output ports;

providing, by at least one of the respective plurality of output ports in response to the plurality of requests to transmit, a feedback message to the input port denying the request to transmit the data unit in the event that a total number of the output buffers associated with the respective output queue and available for data unit storage is less than are needed to store the data unit; and delaying transmission of the data unit from the input queue to the respective plurality of output ports in the event that the at least one of the output ports provides the feedback message denying the request to transmit the data unit.

59. The method of claim 58 further comprising forwarding the data unit to each of the plurality of output queues in the event that none of the to plurality of output ports provide the feedback message denying the request to transmit.

60. The method of claim 58 wherein the feedback message includes a bit indicating whether the request to transmit is granted or denied, and further comprising logically ORing the bit from a plurality of feedback messages to determine whether transmission of the data unit should be delayed.

* * * * *

UNITED STATES PATENT AND TRADEMARK OFFICE
CERTIFICATE OF CORRECTION

PATENT NO. : 5,978,359
DATED : November 2, 1999
INVENTOR(S) : Stephen A. Caldara, et al Page 1 of 1

It is certified that error appears in the above-identified patent and that said Letters Patent is hereby corrected as shown below:

Title page,
The following paragraph should be deleted: "[*] Notice: this patent issued on a continued prosecution application filed under 37 CFR 1.53 (d), and is subject to the twenty year patent term provisions of 35 U.S.C. 154 (a) (2).";

Column 13,
Line 50, claim "25", should read -- claim 24 --;
Line 59, claim "20", should read -- claim 24 --;

Column 14,
Line 15, claim "32", should read -- claim 33 --;
Line 19, claim "32", should read -- claim 33 --;
Line 39, claim "31", should read -- claim 36 --;
Line 43, claim "31", should read -- claim 36 --; and
Line 46, claim "31", should read -- claim 36 --.

Signed and Sealed this

Eleventh Day of September, 2001

Attest:

NICHOLAS P. GODICI
Attesting Officer
Acting Director of the United States Patent and Trademark Office